United States Patent

Valencia et al.

Patent Number: 5,833,412
Date of Patent: Nov. 10, 1998

[54] JET SKI TRAILER LOCKING APPARATUS

[76] Inventors: John H. Valencia; Ana S. Valencia, both of 8142 Garden Ave., Reseda, Calif. 91335

[21] Appl. No.: 854,261

[22] Filed: May 9, 1997

[51] Int. Cl.⁶ .................................................. B60P 7/08
[52] U.S. Cl. ........................ 410/2; 410/3; 410/7; 410/78; 410/120
[58] Field of Search .................... 410/2, 3, 4, 7, 410/77, 78, 120; 248/500, 507, 508; 280/63, 415.1

[56] References Cited

U.S. PATENT DOCUMENTS

| | | | |
|---|---|---|---|
| D. 346,772 | 5/1994 | Godbersen | D12/101 |
| 3,941,406 | 3/1976 | Eggleston | 280/400 |
| 3,951,447 | 4/1976 | Sharp | 296/100.02 |
| 4,502,619 | 3/1985 | Cox | 410/121 X |
| 4,826,200 | 5/1989 | Tingley | 280/414.1 |
| 5,044,845 | 9/1991 | Baker, Jr. | 410/3 |
| 5,203,655 | 4/1993 | Persau | 410/3 |
| 5,607,270 | 3/1997 | Zimmerman | 410/3 |

*Primary Examiner*—Stephen T. Gordon

[57] ABSTRACT

A jet ski trailer locking apparatus for use with a jet ski trailer having a plurality of horizontally oriented longitudinal supports which define a platform. Also included is at least one jet ski with a seat portion. A securement mechanism is included with a horizontally oriented bar. Further provided is at least one securement pin for coupling the securement mechanism to the trailer. By this structure, the securement mechanism may be coupled to the trailer via the securement pins so as to abut the seats of the jet skis thereby precluding the theft of the jet skis.

1 Claim, 3 Drawing Sheets

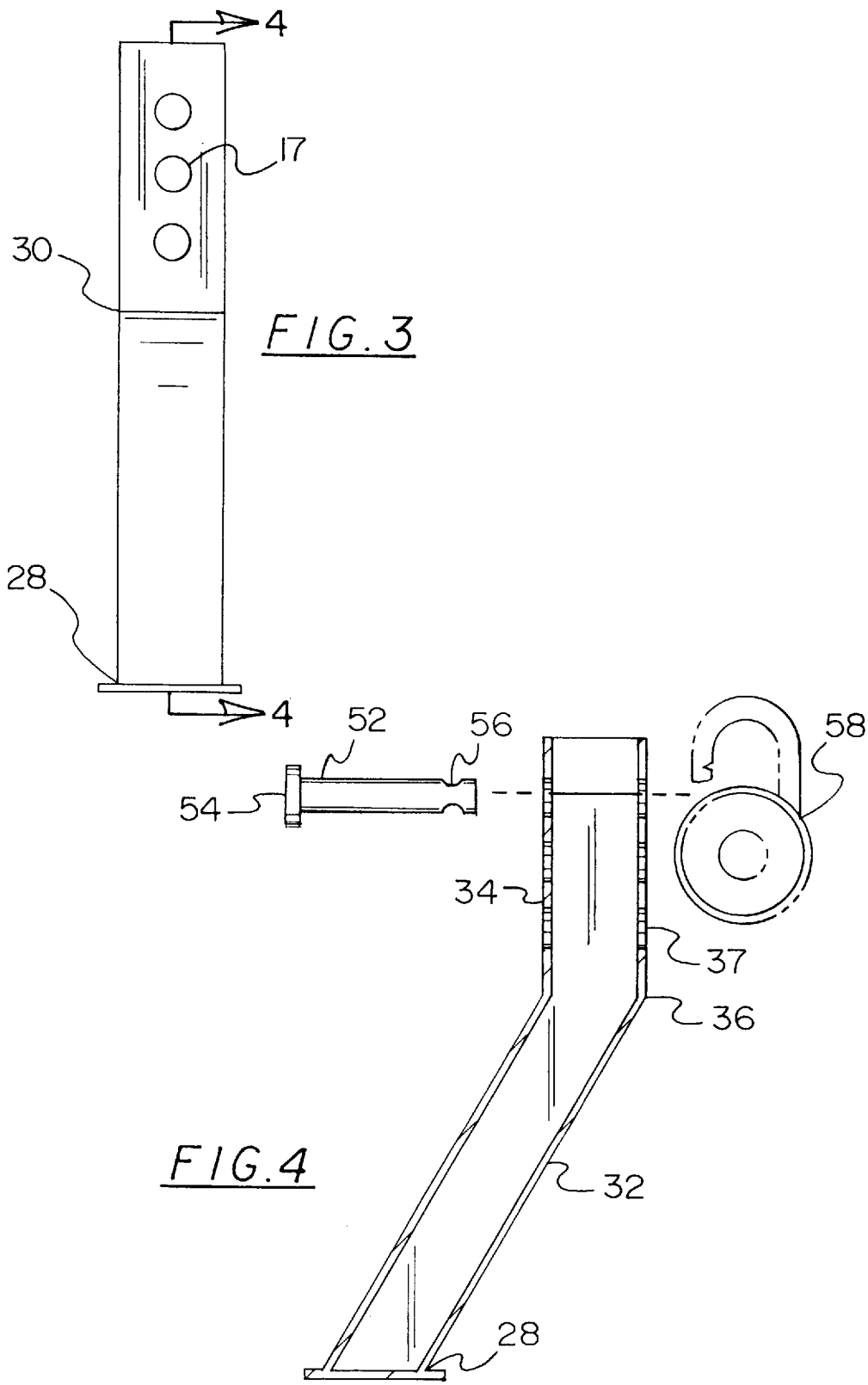

JET SKI TRAILER LOCKING APPARATUS

BACKGROUND OF THE INVENTION.

1. Field Of The Invention

The present invention relates to a jet ski trailer locking apparatus and more particularly pertains to preventing the removal of a jet ski from a jet ski trailer.

2. Description Of The Prior Art

The use of trailer locking mechanisms is known in the prior art. More specifically, trailer locking mechanisms heretofore devised and utilized for the purpose of for preventing the theft of various entities from a trailer are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,203,655 to Persau; U.S. Pat. No. 4,826,200 to Tingley; U.S. Pat. No. Des. 346,772 Godbersen; U.S. Pat. No. 5,044,845 to Baker, Jr.; U.S. Pat. No. 3,941,406 to Eggleston; and U.S. Pat. No. 3,951,447 to Sharp.

In this respect, the jet ski trailer locking apparatus according to the present invention substantially departs from the conventional concepts and designs of the prior art, and in so doing provides an apparatus primarily developed for the purpose of preventing the removal of a jet ski from a jet ski trailer.

Therefore, it can be appreciated that there exists a continuing need for a new and improved jet ski trailer locking apparatus which can be used for preventing the removal of a jet ski from a jet ski trailer. In this regard, the present invention substantially fulfills this need.

SUMMARY OF THE INVENTION

In view of the foregoing disadvantages inherent in the known types of trailer locking mechanisms now present in the prior art, the present invention provides an improved jet ski trailer locking apparatus. As such, the general purpose of the present invention, which will be described subsequently in greater detail, is to provide a new and improved jet ski trailer locking apparatus which has all the advantages of the prior art and none of the disadvantages.

To attain this, the present invention essentially comprises a jet ski trailer having a plurality of horizontally oriented longitudinal supports which define a platform. As shown in FIG. 1, the platform has a hitch coupled at a front end thereof for allowing the selective coupling thereof with a vehicle. Coupled on opposite sides of the trailer are a pair of wheels for allowing transport thereof. A plurality of conventional jet ski braces are situated on a top face of the platform for supporting a pair of jet skis thereon. Further provided are a pair of jet skis each with a front end, a rear end, and a top face. The top face of each of the jet skis has a steering mechanism pivotally coupled thereto adjacent the front end and a seat portion situated thereon adjacent the rear end. While being transported, the jet skis are situated on the braces of the jet ski trailer. With reference to FIGS. 3–5, three shoes are provided including a pair of outboard shoes. The outboard shoes have a lower extent coupled at a bottom end thereof to the longitudinal supports of the trailer on opposite sides thereof adjacent the wheels. Such lower extents of the outboard shoes extend upwardly and outwardly from the point of coupling. Each of the pair of the outboard shoes further has an upper extent coupled to a top end of the corresponding lower extent and extended upwardly therefrom. The plurality of shoes further include an inboard shoe with a vertically oriented lower extent and upper extent. See FIG. 5. The upper extents of the shoes have a plurality of linear aligned laterally extending bores formed therein. As best shown in FIG. 2 & 5, a securement mechanism is provided which includes a horizontally oriented bar. An elastomeric padding lines a bottom surface of the horizontally oriented bar. Three sleeves are provided including a pair of outboard sleeves integrally coupled at opposite ends of the horizontally oriented bar and extended downwardly therefrom. A pair of closed loop handles are formed on the outboard sleeves. The three sleeves also include an inboard sleeve integrally coupled at a central extent of the horizontally oriented bar and depended downwardly therefrom. As shown in FIG. 5, bottom ends of the sleeves have a single laterally extending bore formed therein. Also included is three securement pins each comprising a post with a circular flange formed on a first end thereof. Formed in a second end thereof is a vertically extending bore.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved jet ski trailer locking apparatus which has all the advantages of the prior art trailer locking mechanisms and none of the disadvantages.

It is another object of the present invention to provide a new and improved jet ski trailer locking apparatus which may be easily and efficiently manufactured and marketed.

It is a further object of the present invention to provide a new and improved jet ski trailer locking apparatus which is of a durable and reliable construction.

An even further object of the present invention is to provide a new and improved jet ski trailer locking apparatus which is susceptible of a low cost of manufacture with regard to both materials and labor, and which accordingly is then susceptible of low prices of sale to the consuming public, thereby making such jet ski trailer locking apparatus economically available to the buying public.

Still yet another object of the present invention is to provide a new and improved jet ski trailer locking apparatus which provides in the apparatuses and methods of the prior art some of the advantages thereof, while simultaneously overcoming some of the disadvantages normally associated therewith.

Still another object of the present invention is to prevent the removal of a jet ski from a jet ski trailer.

Lastly, it is an object of the present invention to provide a new and improved jet ski trailer locking apparatus for use with a jet ski trailer having a plurality of horizontally oriented longitudinal supports which define a platform. Also included is at least one jet ski with a seat portion. A securement mechanism is included with a horizontally oriented bar. Further provided is at least one securement pin for coupling the securement mechanism to the trailer. By this structure, the securement mechanism may be coupled to the trailer via the securement pins so as to abut the seats of the jet skis thereby precluding the theft of the jet skis.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side view of one of the outboard shoes of the present invention.

FIG. 4 is a cross-sectional view of the present invention taken along line 4—4 shown in FIG. 3.

Similar reference characters refer to similar parts throughout the several views of the drawings.

DESCRIPTION OF THE PREFERRED EMBODIMENT

Figure 1:
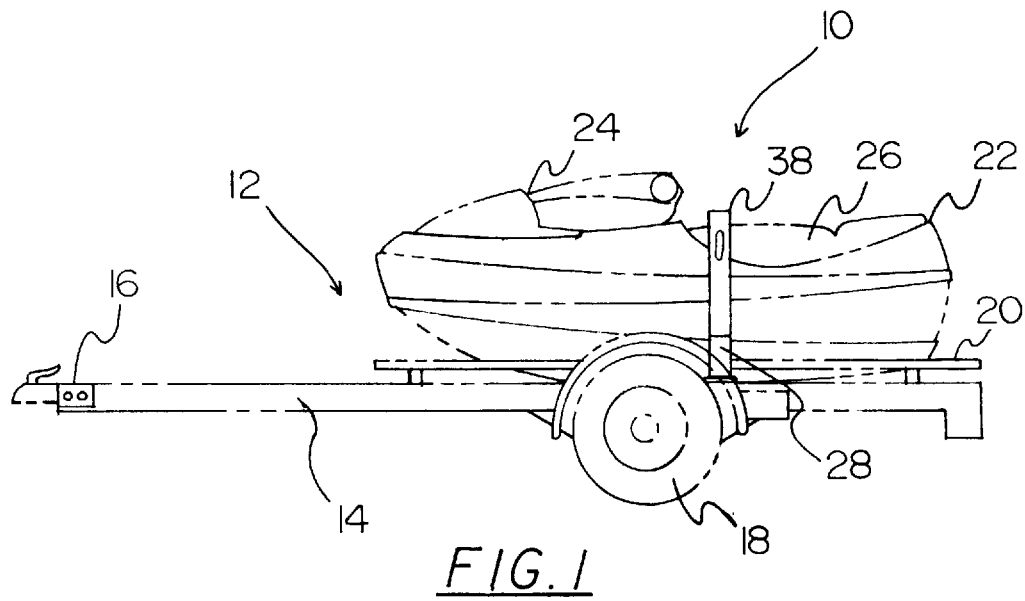
FIG. 1 is a perspective illustration of the preferred embodiment of the jet ski trailer locking apparatus constructed in accordance with the principles of the present invention.

With reference now to the drawings, and in particular to FIG. 1 thereof, a new and improved jet ski trailer locking apparatus embodying the principles and concepts of the present invention and generally designated by the reference numeral 10 will be described.

The present invention, the new and improved jet ski trailer locking apparatus, is comprised of a plurality of components. Such components in their broadest context include a jet ski trailer, a pair of jet skis, a plurality of shoes, a securement mechanism, and a plurality of securement pins. Such components are individually configured and correlated with respect to each other so as to attain the desired objective.

More specifically, it will be noted that the system 10 of the present invention includes a jet ski trailer 12 having a plurality of horizontally oriented longitudinal supports 14 which define a platform. As shown in FIG. 1, the platform has a hitch 16 coupled at a front end thereof for allowing the selective coupling thereof with a vehicle. Coupled on opposite sides of the trailer are a pair of wheels 18 for allowing the transport thereof. A plurality of conventional jet ski braces 20 are situated on a top face of the platform for supporting a pair of jet skis thereon.

Further provided are a pair of jet skis 22 each with a front end, a rear end, and a top face. The top face of each of the jet skis has a steering mechanism 24 pivotally coupled thereto adjacent the front end and a seat portion 26 situated thereon adjacent the rear end. The seat is conventionally angled downwardly between the rear end and the front end thereof. While being transported, the jet skis are situated on the braces of the jet ski trailer. Such braces are preferably, slightly angled to conform to a bottom of the jet skis, as is conventional in the art.

Figure 5:
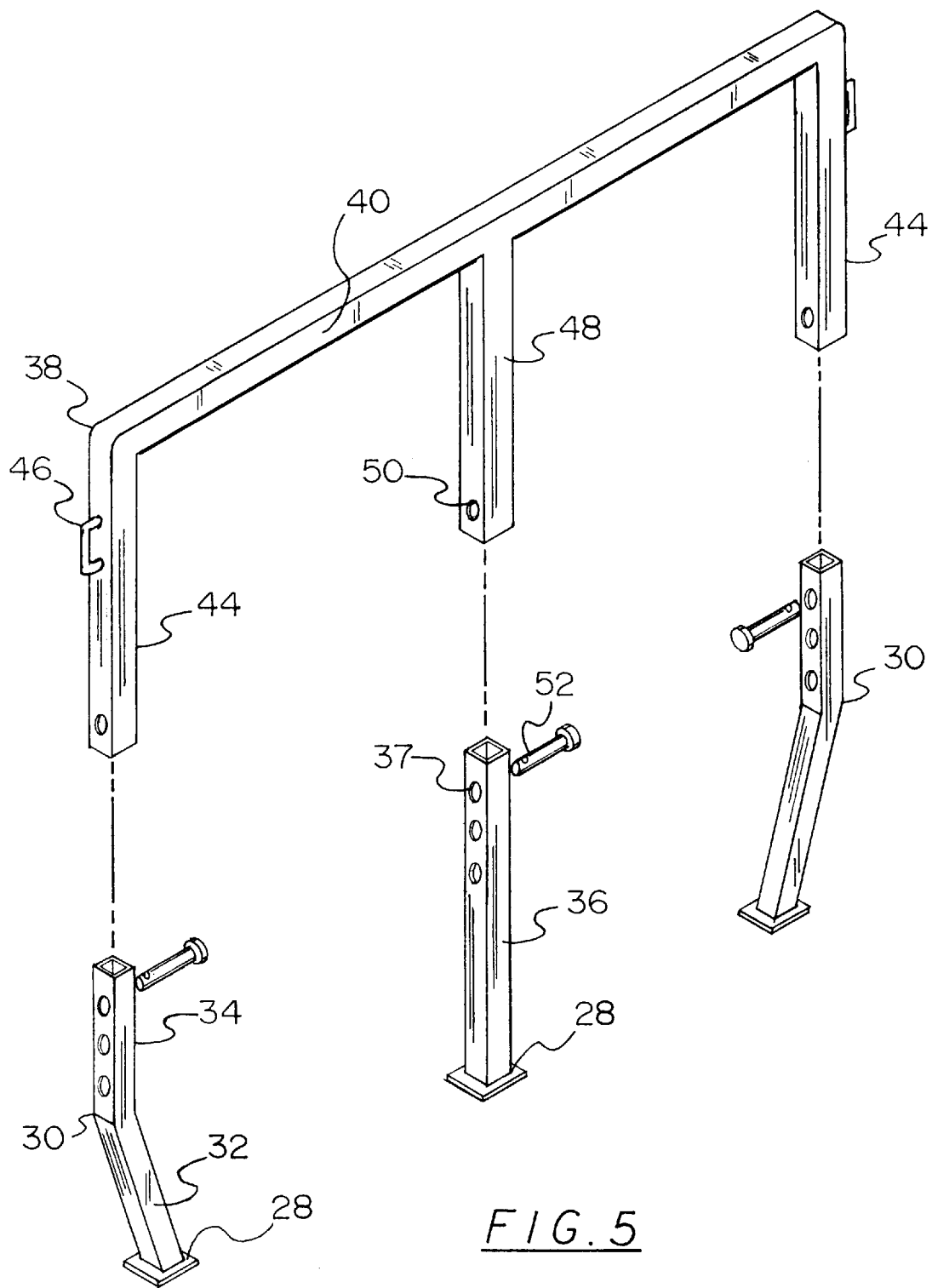
FIG. 5 is an exploded view of the present invention.

With reference to FIGS. 3–5, three shoes 28 are provided including a pair of outboard shoes 30. The outboard shoes have a lower extent 32 integrally coupled at a bottom end thereof to the longitudinal supports of the trailer on opposite sides thereof adjacent the wheels. Such lower extents of the outboard shoes extend upwardly and outwardly from the point of coupling. Each of the pair of the outboard shoes further has an upper extent 34 coupled to a top end of the corresponding lower extent and extended upwardly therefrom. Ideally, the upper extent has a length of about ½ that of the lower extent and the lower extent forms an angle of approximately 120 degrees with the horizontal. The plurality of shoes further include an inboard shoe 36 coupled to the trailer between the outboard shoes with a vertically oriented lower extent and upper extent. See FIG. 5. The upper extents of the shoes each have a plurality of linear aligned laterally extending bores 37 formed therein. Ideally, the shoes have a rectilinear cross-section.

Figure 2:
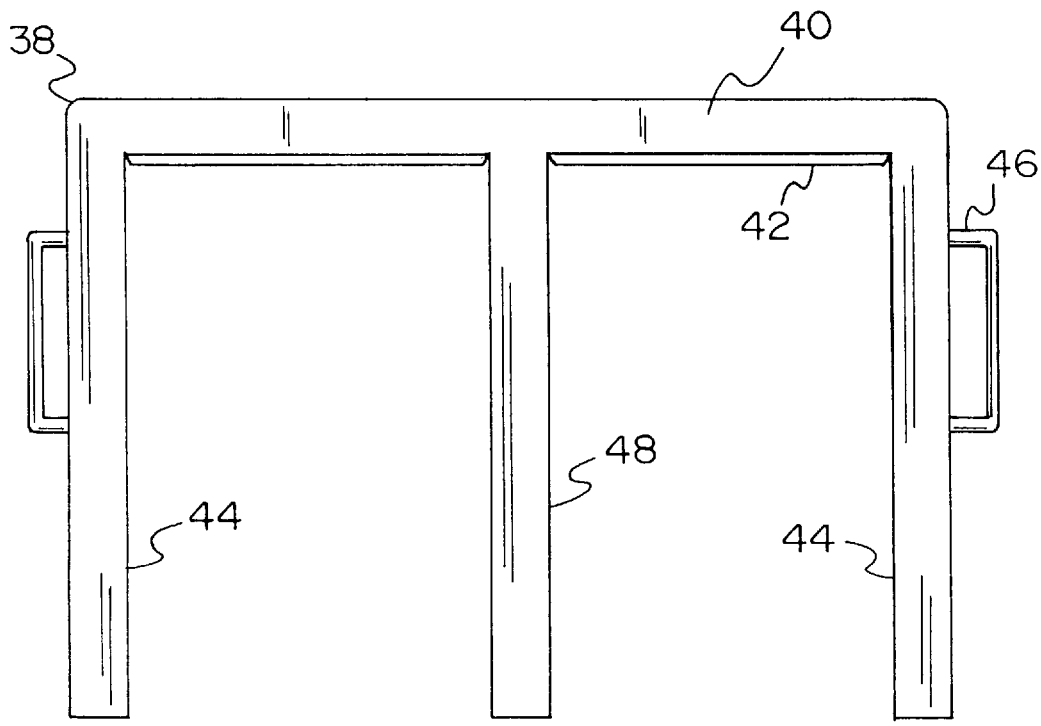
FIG. 2 is a front view of the securement mechanism of the present invention.

As best shown in FIG. 2 & 5, a securement mechanism 38 is provided which includes a horizontally oriented bar 40. An elastomeric padding 42 lines a bottom surface of the horizontally oriented bar. Three sleeves are provided including a pair of outboard sleeves 44 integrally coupled at opposite ends of the horizontally oriented bar and extended downwardly therefrom. A pair of closed loop handles 46 are formed on the outboard sleeves on an outer surface thereof. The three sleeves also include an inboard sleeve 48 integrally coupled to a central extent of the horizontally oriented bar and depended downwardly therefrom. Each sleeve has a rectilinear cross-section which defines an area greater than that of the shoes. As shown in FIG. 5, bottom ends of the sleeves have a single laterally extending bore 50 formed therein.

Also included is three securement pins 52 each comprising a post with a circular flange 54 formed on a first end thereof. Formed in a second end thereof is a vertically extending bore 56.

In use, the sleeves of the securement mechanism may be slidably situated about the shoes. As such, the padding of the securement mechanism abuts the seats of the jet skis and further the bores of the sleeves are aligned with one of the bores of the shoes so that the securement pins may be situated therein. A conventional padlock 58 may be secured to the bore of at least one of the securement pins for precluding the removal of the securement mechanism and theft of the jet skis.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved jet ski trailer locking apparatus comprising, in combination:

a jet ski trailer having a plurality of horizontally oriented longitudinal supports which define a platform, the platform having a hitch coupled at a front end thereof for allowing the selective coupling thereof with a vehicle, a pair of wheels coupled on opposite sides of the trailer for allowing transport thereof, and a plurality of jet ski braces situated on a top face of the platform for supporting a pair of jet skis thereon;

a pair of jet skis each with a front end, a rear end, a top face with a steering mechanism pivotally coupled thereto adjacent the front end and a seat portion situated thereon adjacent the rear end, whereby the jet skis are situated on the braces of the jet ski trailer;

three shoes including a pair of outboard shoes having a lower extent coupled at a bottom end thereof to the longitudinal supports of the trailer on opposite sides thereof adjacent the wheels and further extending upwardly and outwardly therefrom, each of the pair of the outboard shoes further having an upper extent coupled to a top end of the corresponding lower extent and extending upwardly therefrom, the plurality of shoes further including an inboard shoe with a vertically oriented lower extent and upper extent, the upper extents of the shoes having a plurality of linear aligned laterally extending bores formed therein;

a securement mechanism including a horizontally oriented bar with an elastomeric padding lining a bottom surface thereof, and three sleeves including a pair of outboard sleeves integrally coupled at opposite ends of the horizontally oriented bar and extended downwardly therefrom with a pair of closed loop handles formed thereon, the three sleeves including an inboard sleeve integrally coupled at a central extent of the horizontally oriented bar and depended downwardly therefrom, wherein bottom ends of the sleeves have a single laterally extending bore formed therein; and three securement pins each including a post with a circular flange formed on a first end thereof and a vertically extending bore formed in a second end thereof;

whereby the sleeves of the securement mechanism may be slidably situated about the shoes such that the padding of the securement mechanism abuts the seat portions of the jet skis and the bores of the sleeves are aligned with one of the bores of each of the shoes so that the securement pins may be situated therein and a lock may be secured to the bore of at least one of the securement pins for precluding the removal of the securement mechanism and theft of the jet skis.

* * * * *